United States Patent [19]
Kunin

[11] 3,916,025
[45] Oct. 28, 1975

[54] REMOVAL OF SULFUR DIOXIDE AND/OR TRIOXIDE FROM GASEOUS EFFLUENTS OF FOSSIL FUEL OPERATED POWER AND STEAM PLANTS

[75] Inventor: Robert Kunin, Yardley, Pa.

[73] Assignee: Rohm and Haas Company, Philadelphia, Pa.

[22] Filed: Mar. 14, 1973

[21] Appl. No.: 341,204

[52] U.S. Cl. .................................. 423/242; 423/166
[51] Int. Cl.² .......................................... C01B 17/00
[58] Field of Search ........................... 423/242–244, 423/555, 166

[56] References Cited
UNITED STATES PATENTS

| | | | |
|---|---|---|---|
| 2,044,942 | 6/1936 | Heckert | 423/555 |
| 3,330,621 | 7/1967 | Vian-Ortuno et al | 423/545 |
| 3,709,977 | 1/1973 | Villiers-Fisher | 423/244 |

*Primary Examiner*—Oscar R. Vertiz
*Assistant Examiner*—Gregory A. Heller

[57] ABSTRACT

This invention relates to the removal of sulfur dioxide ($SO_2$) and/or sulfur trioxide ($SO_3$) from the gaseous effluents of fossil fuel burning steam and power plants using certain macroreticular, weak acid, cation exchange resins. The gaseous streams to be treated may be derived from other sources but the invention has particular utility and applicability in the control of pollution emanating from the $SO_2$ and $SO_3$ contained in the gaseous effluents of fossil fuel burning steam and power plants.

6 Claims, No Drawings

REMOVAL OF SULFUR DIOXIDE AND/OR TRIOXIDE FROM GASEOUS EFFLUENTS OF FOSSIL FUEL OPERATED POWER AND STEAM PLANTS

This invention sets forth and encompasses a unique and novel ion exchange resin system for removing $SO_2$ and $SO_3$ from the stack gases of fossil fuel burning operations. The novel process is based upon the reaction between the salt form of a weak acid cation exchange resin and $SO_2$ and/or $SO_3$ in the presence of water vapor and oxygen to form acid sulfite and sulfate salts within the pore structure of the ion exchange resin. The acid sulfite and sulfate salts are eluted from the ion exchanger with water and treated with a stoichiometric quantity of lime to recover alkali with which to regenerate the ion exchange resin. The $SO_2$ is therefore fixed and recovered as insoluble $CaSO_4$ (gypsum). The ion exchange resin system removes more than 90% of the $SO_2$ and $SO_3$ and has the advantages of extremely high capacity and high flow rate capability. It consumes only 1 mole of CaO per mole of $SO_2$ removed. Alternatively, the sulfite-containing eluate can be processed to produce elemental sulfur or sulfuric acid. The novel ion exchange resin system also removes significant amounts of the acidic oxides of nitrogen.

During the past several years, a concerted effort has been made to eliminate the emission of $SO_2$ from the stacks of fossil fuel burning steam and power plants. Although some success has been achieved through the development of low-sulfur fuels, this route does not hold much promise for solving the major problem. The reason for this is severalfold. First, there are not significant sources of low sulfur fuels available. Second, the low sulfur fuels that are available are not sufficiently low in sulfur to lower the stack gases to levels much below 500 ppm $SO_2$ and it appears that pressures will soon be applied to decrease the emission levels to 50 ppm $SO_2$. Third, technology for decreasing the sulfur values of fossil fuels to levels that will reduce the emission levels to 50 ppm is not available and the likelihood for developing such technology is remote. It therefore appears that the most promising solutions to the $SO_2$ emission problem will involve the application of some technology that will allow the removal of $SO_2$ directly from the stack gas.

Although many $SO_2$ removal systems have been developed, practically all may be classified into one of two groups. The first involves scrubbing the gas stream with alkaline reagents which form $CaSO_4$ directly or indirectly through causticization. The second involves adsorption and/or catalyst processes with subsequent recovery of the $SO_2$ as sulfuric acid as a by-product of the fuel burning operation.

The concept of removing and of recovering $SO_2$ as $H_2SO_4$ as a salable by-product does not appear to be practical at all for small or medium sized industrial steam or power plants. Recovering $SO_2$ as $H_2SO_4$ from large plants is also questionable in many instances since such plants are primarily power utilities and the problems faced by a public utility producing chemicals, especially concentrated acids, are indeed knotty ones, particularly when the value of the chemical by-product fluctuates considerably. This situation, however, will vary from location to location. What is really desired and needed is a low cost and reliable system for removing $SO_2$ without the need to market a by-product whose true market value might be questionable from time to time. The present invention fills this need.

This invention includes as one of its features a novel method for removing $SO_2$ from stack gases involving an ion exchange resin technique which merely consumes an equivalent amount of lime and results in a solid and easily disposable waste of gypsum, $CaSO_4 \cdot 2H_2O$. In essence, the overall stoichiometry reduces to:

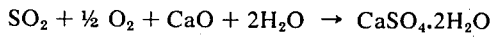
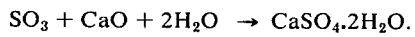

The technique does not involve treating the stack gases with lime or limestone. It is already known that these are highly inefficient processes and are also troublesome. The overall stoichiometry or chemistry of the ion exchange resin approach merely reduces to the above-noted reaction scheme which is illustrated above.

Before describing in more detail the ion exchange technique, it is important to consider the problem of disposing the end product, $CaSO_4 \cdot 2H_2O$. If, for example one considers a plant producing 1,000,000 standard cubic feet per minute (scfm) of stack gas containing about 1,000 ppm of $SO_2$, the stoichiometry is such that the solid waste load will be approximately 270 tons of $CaSO_4$ per day. This load is, of course, a sizable one. It is, however, of some interest to speculate about the disposal of gypsum. First, we have reduced the waste problem to a solid which can be readily stored, piled or buried. Second, the solid is relatively insoluble and the products of solution are quite harmless. Saturated solutions of $CaSO_4$ (ca. 1,500 ppm as $CaCO_3$) do not cause any problems in the growth of fish, animal stocks, or plants. Gypsum is widely used agriculturally as a soil amendment to improve tilth and to overcome the harmful effects of sodium salts present in irrigation waters. In essence, it is one of the least harmful waste products with which we are faced. In fact, many liquid waste effluents containing sulfates are currently being treated with lime to form $CaSo_4$.

At the present time, gypsum is being mined in the U.S. and even imported to satisfy our needs for agricultural purposes, wall board, and other building products. The following table summarizes some recent information concerning the production and market for gypsum:

Production Data on Gypsum

| Source | (1969 - U.S. Department of Commerce) Million Tons/Year | Market Value $/Ton |
|---|---|---|
| Mined in U.S. | 9.7 | 3.40 |
| Imported by U.S. | 5.8 | 3.40 |
| By-Product ($H_3PO_4$ production) | 22.0 | 0.50 or less |
| Potential From Stack Gases | | |
| Fossil Fuels | 44 | |
| Misc. (Copper and $H_2SO_4$ (Industries) | 13 | |

It is quite obvious that gypsum is a major and valuable article of commerce for several basic applications. It is also quite obvious that recovery of $SO_2$ as $CaSO_4$ from stack gases could supply more than our current need for gypsum. The $CaSO_4$ produced from stack gases by means of the present novel and inventive ion exchange resin technique would be of high quality and be competitive with primary gypsum sources.

Moreover, the gypsum approach can be applied to small and medium sized power plants. Also, the capital investment is considerably less for gypsum recovery approach. The process would not depend upon a market for the by-product as in the case for $H_2SO_4$ production.

The prior art suggests that one should be able theoretically to remove the $SO_2$ from stack gases by contacting the stream with some alkaline reagent. For example, the gas could be scrubbed with dry limestone or lime to produce $CaSO_4$. One might also consider scrubbing the stack gases with slurries of limestone or lime. All of these possibilities have been studied in detail and some variations are in use but have been found lacking in many respects. Limestone scrubbing apparently removes less than 50% of the $SO_2$ and requires large excesses of reagent above that required stoichiometrically. Lime is more effective; however, it too requires large excesses of reagent. Further, wet scrubbing with slurries of lime are quite troublesome because of inherent scaling problems.

Wet scrubbing of stack gases with soluble alkaline reagents such as ammonia or caustic have also been tried using some causticization technique in order to recycle the expensive scrubbing reagents. The $SO_2$ is eventually recovered as gypsum. There are, however, several problems associated with liquid-gas scrubbing systems. One serious objection is that of almost constant plume formation.

There are also situations in which it may be profitable to recover all or portions of the $SO_2$ as either elemental sulfur (S) or sulfuric acid ($H_2SO_4$). These options are available within the concepts of the present invention. The effluent from the water wash of the macroreticular, weak acid, cation exchange resin which contains a major proportion of acid alkali sulfites may be treated by the conventional Claus reaction to produce elemental sulfur or the effluent may be thermally stripped to produce $SO_2$. The latter may then be sent to a Contact Acid Plant to be recovered as sulfuric acid.

DETAILED DESCRIPTION OF PROCESS

A partially or fully hydrated macroreticular carboxylic cation exchange resin in the alkali metal salt form, preferably Na+ or (for purposes of this invention ammonium is included in the term alkali metal) $NH_4+$ has been found to be most effective for removing $SO_2$ from gas streams via the following reactions which illustrate, but do not limit the invention: (other salt forms as noted above may also be used)

$$RCOONa + SO_2 + H_2O \rightarrow RCOOH + NaHSO_3$$

The moisture is supplied from either or both the gas stream and the partially hydrated ion exchange resin. The $NaHSO_3$ apparently occupies the microreticular and macroreticular pore volume in the form of microcrystals and/or a saturated solution phase. The salt is extremely soluble and is readily rinsed from the ion exchange resin with but a couple of bed volumes of water, leaving the ion exchange resin in the hydrogen form. The cation exchanger is next regenerated with an equivalent amount of NaOH (or other base), $$RCOOH + NaOH \rightarrow RCOONa + H_2O$$

The caustic can be and is most readily obtained by the causticization of the $NaHSO_4$ liquor with lime, $$NaHSO_4 + CaO + \tfrac{1}{2} O_2 \rightarrow NaOH + CaSO_4 \downarrow$$

The $CaSO_4$ is then settled and the alkaline supernatant liquor recycled in known manner.

A similar system can be used with the ammonium of the carboxylic acid cation exchanger. The corresponding reactions involved are as follows:

$$RCOONH_4 + SO_2 + H_2O \rightarrow RCOOH + NH_4HSO_3$$

$$NH_4HSO_3 + CaO + \tfrac{1}{2} O_2 \rightarrow NH_3\uparrow + CaSO_4\downarrow + H_2O$$

Instead of separating and washing the $CaSO_4$ to recover the caustic, the $NH_4OH$ is recovered by stripping the $NH_3$ with low pressure steam as in the Solvay Process.

As regards capacity, one can, for example, achieve a capacity of approximately 14 lbs. $SO_2$ per cubic foot of cation about 500 to 1,000 bed volumes per minute or a contact time of 0.1–0.2 seconds. These conditions translate to an exhaustion time of 30–60 minutes for a gas stream containing 1,000 ppm of $SO_2$. For a 1,000 MW power plant and assuming a gas flow of 1,800,000 scfm, one calculates an ion exchange resin inventory of 3,600–7,200 cubic feet (half on stream and half off stream) depending upon the contact time selected. These data are based upon a $SO_2$ (and/or $SO_3$) adsorption temperature of approximately 90°C.

In considering the practical aspects of the proposed system, one must acknowledge possible problems resulting from the presence of fly ash, oil aerosols, dust, etc. In this connection, the ion exchange operation may follow an electrostatic precipitator or other fly ash removing systems in the event one or more of these materials become a problem. If wet scrubbing of fly ash is considered, the drainage from the settled fly ash (if coal is used) contains sufficient alkali to compensate for alkali lost during the causticization step.

It should be noted that the novel ion exchange resin system or method is capable of removing significant quantities of the acidic noxious oxides of nitrogen present along with the $SO_2$ (or $SO_3$) in the stack gas.

In terms of disposing the gypsum, some consideration may be given to using abandoned coal mines as a repository for the solid waste. Some of the empty coal cars returning to the mines from the power stations could be used for this purpose. Other method of solid waste disposal can also be envisioned and they form no part of this invention.

The preferred classes of weakly acidic cation exchangers useful in the present process for removing $SO_2$ and/or $SO_3$ from fossil fuel fired stack gases are those in which the cation exchange activity is due to the presence of carboxylic acid groups in the molecule. Weakly acidic cation exchange resins having carboxylic functionality are well known and commercially available and the preparation of such resins is described, for example, in U.S. Pat. Nos. 2,340,110 and 2,340,111. The resins useful in the present invention are further characterized by the fact that they have a porous, macroreticular structure which structure is also now well known. For example, methods for forming or producing such resins are described, for example, in detail in U.S. Pat. No. 3,586,646 and in British Pat. Nos. 932,125 and 932,126, the disclosures of which are all herein incorporated by reference. Other methods apparent to those skilled in the art can also be used, for example, the swelling solvent technique taught in U.S. Pat. No. 3,586,646, or the salt water precipant technique. In general, for the production of cation exchangers with carboxylic acid groups, a suitable crosslinking agent, preferably a polyvinyl aromatic compound, is copolymerized with the monoethylenically unsaturated carboxylic acids, such as acrylic acid, methacrylic acid, half esters of lower aliphatic alcohols with monoethylenically unsaturated polycarboxylic acids such as maleic acid, fumaric acid, and mixtures thereof. One can also use the completely esterified derivatives of such acids or the anhydrides thereof followed by hydrolysis of the copolymers obtained.

Ordinarily, the amount of crosslinker will vary in a range of from about 2% to 50% by weight as based on the total amount of the monomers used. More preferably the crosslinker will vary from about 2 to 20%, and even more preferably from about 3 to 10% by weight. Suitable crosslinking agents comprise the polyethylenically unsaturated compounds (that is to say, compounds containing at least 2 vinylidene ($CH=C<$) or ethylene ($-C'=C'-$) groups, such as for example, divinylbenzene, trivinylbenzene, ethylene glycol dimethacrylate, ethylene glycol diacrylate, diallylmalate, divinyl ether, polymerizable esterification products of dihydric alcohols, such as glycol, diethylene glycol, butane diol, and $\alpha,\beta$-ethylenically unsaturated acids such as maleic fumaric acids, such as glycol, other polyfunctional methacrylates such as trimethylolpropane trimethacrylate, and others which will readily be apparent to those skilled in the art. One particularly preferred carboxylic resin is prepared by suspension copolymerizing the mixture of methacrylic acid and divinylbenzene using about 3 to 10% divinylbenzene. This type of resin is commercially available as Amberlite IRC-50. Another preferred carboxylic exchanger is prepared by copolymerizing methyl or ethyl acrylate with divinylbenzene and subsequently hydrolyzing the copolymer to produce carboxylic groups. The macroreticular porous resins should have a surface area of at least about one square meter per gram, a porosity or pore volume of at least about 10% and pore diameters of at least about 50 Angstrom units. The surface area may range upwards to several hundred or even several thousand square meters per gram, the porosity may extend to 50 to 60%, and the pore size may range up to several hundred Angstrom units or even several thousand Angstrom units.

Ordinarily, the $SO_2$ and/or $SO_3$ is removed or adsorbed at a temperature that will vary from about 40° to about 120°C., and more preferably from about 80° to 100°C. The sodium bisulfite or other soluble bisulfite or sulfate salt is eluted, preferably with water or other aqueous media, from the resin usually at all about room temperature (20°C.) but higher temperatures up to 40° or 50°C. or even higher can be used.

In the Examples below, and throughout the specification and claims, all parts and percentages are bag weight unless otherwise stated:

EXAMPLE 1

A 3 ml. sample of a hydrated 16–50 mesh macroreticular, carboxylic, cation exchange resin in the sodium form is placed in a ¼ inch diameter tube and a simulated stack gas stream containing 1700 ppm $SO_2$ is passed through the ion exchange resin column heated to a temperature of 90°C. and a flow rate of 1000 ml./min. The leakage of $SO_2$ is found to be less than 50 ppm until a capacity of 1.8 mmols of $SO_2$ is realized. A saturation capacity of 3.4 mmols of $SO_2$ is realized in approximately twice the time required to reach the point at which leakage was noted. The macroreticular, cation exchange resin is a bead or suspension polymerized, crosslinked methacrylic acid-divinylbenzene (about 4.5% divinylbenzene) resin having the following properties: Surface area of about 2 sq. meters/gram; Pore range size about 700 to about 4000 Angstrom units; Pore volume or porosity of about 0.16 cc/cc or 0.14 cc/gram, all properties measured in the dry H+ form.

EXAMPLE 2

The sample of ion exchange resin saturated with $SO_2$ in Example 1 is leached with 6 ml. of water at a flow rate of 0.05 ml./ml. of resin/min. and the combined effluent analyzed for $SO_2$. Greater than 99% of the adsorbed $SO_2$ is found in the effluent.

EXAMPLE 3

The combined aqueous effluent of Example 2 is treated with 3.8 mmols of lime and filtered. The limed filtrate is then contacted for 30 min. with the washed resin of Example 2 and the regenerated and neutralized resin is then recontacted with the simulated stack gas as in Example 1. Greater than 90% of the initial capacity is realized.

Example 4

Example 1 is repeated using the hydrated macroreticular, cation exchange resin in the ammonium cycle or form. The capacities obtained are equivalent to those obtained in Example 1.

EXAMPLE 5

Using the exhausted sample of Example 4, Example 2 is repeated with almost equivalent results.

EXAMPLE 6

The eluate of Example 5 is treated with 3.8 mmols of lime and the mixture distilled to recover the liberated $NH_3$. Greater than 95% of the ammonia was recovered in the distillate.

EXAMPLE 7

Example 1 can be repeated with a gas stream containing small amounts of $SO_3$ to thereby substantially remove all $SO_3$ from the gas stream for a significant period of time.

EXAMPLE 8

Example 1 can be repeated except that the resin of Example 1 is replaced with the sodium salt or sodium form of a macroreticular, carboxylic, hydrolyzed crosslinked methyl acrylate resin to achieve similar or improved results as in Example 1. The weak acid resin is a crosslinked macroreticular copolymer of about 83% methyl acrylate, 8% divinylbenzene, 2% diethylene glycol divinyl ether and about 7% ethyl vinyl benzene, using 40% diisobutyl ketone as the phase extender, and made according to the teachings of British Pat. Nos. 932,125 and 932,126. This resin has a porosity of about 15%. A similar resin having about 5% porosity, and made with a toluene phase extender or precipitant, can also be used.

EXAMPLE 9

Example 1 can be repeated to achieve similar results in the removal of $SO_2$ and/or $SO_3$ but using a crosslinked macroreticular, carboxylic, weak acid resin made according to the teaching of U.S. Pat. No. 3,586,646, especially Example 1 thereof.

With respect to the means or manner in which the gas containing the $SO_2$ and/or $SO_3$ is contacted with the macroreticular, weak acid, cation exchange resin, any of the standard gas adsorption techniques may be used. Thus, for example, there may be employed fixed bed or countercurrent moving bed systems, preferably with beads or particles of the cation exchange resin in about the 16–50 mesh size (U.S. Standard Sieve). Further, one may elect to use fluidized beds with 325 mesh cation exchange resin beads.

With respect to the means or manner in which the gas containing the $SO_2$ and/or $SO_3$ is contacted with the macroreticular, weak acid, cation exchange resin, any of the standard gas adsorption techniques may be used. Thus, for example, there may be employed fixed bed or countercurrent moving bed systems, preferably with beads or particles of the cation exchange resin in about the 16–50 mesh size (U.S. Standard Sieve). Further, one may elect to use fluidized beds with 325 mesh cation exchange resin beads.

I claim:

1. A process for removing $SO_2$ or $SO_3$, or a mixture of $SO_2$ or $SO_3$, from a first gaseous stream containing same, which comprises contacting said stream with an alkali metal salt form of a crosslinked macroreticular, weak acid cation exchange resin, thereby removing the $SO_2$ or $SO_3$ or mixture thereof from the first gaseous stream to produce a second gaseous stream which is essentially free of $SO_2$ or $SO_3$ or a mixture thereof, the removal and adsorption of the $SO_2$ or $SO_3$ taking place at a temperature in the range of about 40° to 120° C.

2. Process according to claim 1 wherein the removal and adsorption of the $SO_2$ or $SO_3$ takes place at a temperature in the range of about 80° to 100° C.

3. Process according to claim 2 wherein the macroreticular, weak acid cation exchange resin is in the ammonium form.

4. Process according to claim 1 wherein the macroreticular weak acid cation exchange resin is in the sodium form.

5. Process according to claim 4 wherein the $SO_2$ or $SO_3$ or mixture thereof is converted to an acid sulfite or sulfate, or mixture thereof, water-soluble salt form within the pore structure of the ion exchange adsorbing resin.

6. Process according to claim 5 wherein the acid sulfite or sulfate salts or mixtures of said salts are eluted at a temperature of from about 20° to 50° C. from the resin with water or other aqueous media and thereafter treated with lime to recover alkali and to further convert the salts to gypsum.

* * * * *

UNITED STATES PATENT OFFICE
CERTIFICATE OF CORRECTION

PATENT NO. : 3,916,025
DATED : October 28, 1975
INVENTOR(S) : Robert Kunin

It is certified that error appears in the above-identified patent and that said Letters Patent are hereby corrected as shown below:

In column 4, line 16, after the word "cation", insert the language
-- exchange resin at a flow rate of -- ;

In column 5, line 54, change "bag" to -- by -- .

Signed and Sealed this ninth Day of March 1976

[SEAL]

Attest:

RUTH C. MASON
Attesting Officer

C. MARSHALL DANN
Commissioner of Patents and Trademarks